United States Patent [19]
van Blerk

[11] Patent Number: 4,599,667
[45] Date of Patent: Jul. 8, 1986

[54] AUTOMATIC AZIMUTH ANGLE ADJUSTMENT HEAD MOUNTING STRUCTURE

[75] Inventor: Victor B. van Blerk, San Jose, Calif.

[73] Assignee: Verbatim Corporation, Sunnyvale, Calif.

[21] Appl. No.: 588,319

[22] Filed: Mar. 12, 1984

[51] Int. Cl.⁴ .................................................. G11B 5/55
[52] U.S. Cl. ..................................... 360/106; 360/109
[58] Field of Search ........................ 360/75, 76, 77, 78, 360/106, 105, 107, 109; 369/223, 215, 250; 74/89.15

[56] References Cited

U.S. PATENT DOCUMENTS

| | | | |
|---|---|---|---|
| 1,438,642 | 1/1922 | Graham | 369/250 |
| 2,938,962 | 5/1960 | Konins et al. | 360/76 |
| 4,097,908 | 6/1978 | Chou et al. | 360/76 |
| 4,135,722 | 1/1979 | Paulson et al. | 369/223 |
| 4,388,655 | 6/1983 | Zenzefilis | 360/107 |
| 4,423,449 | 12/1983 | Hasegawa | 360/106 |
| 4,556,924 | 12/1985 | Quist, Jr. et al. | 360/106 |

FOREIGN PATENT DOCUMENTS 0129929 10/1980 Japan ....................................... 360/76

OTHER PUBLICATIONS

Rudolf W. Lissner, David H. McMurtry, and Richard A. Wilkinson, Disk File Actuator Design Permits Increased Track Density, 2/79.

Primary Examiner—John H. Wolff
Assistant Examiner—Andrew L. Sniezek
Attorney, Agent, or Firm—Dennis P. Monteith

[57] ABSTRACT

Apparatus for automatically adjusting the azimuth angle of a transducer head relative to a media recording surface when the transducer head is driven in a non-radial path about the media recording surface with a transducer head supported by a positioning support shaft located within a head carriage. The head carriage receives drive forces from a worm gear and the positioning support shaft is attached to a control shaft and a positioning shaft for azimuth angle alignment during head carriage movement.

8 Claims, 2 Drawing Figures

U.S. Patent  Jul. 8, 1986  4,599,667
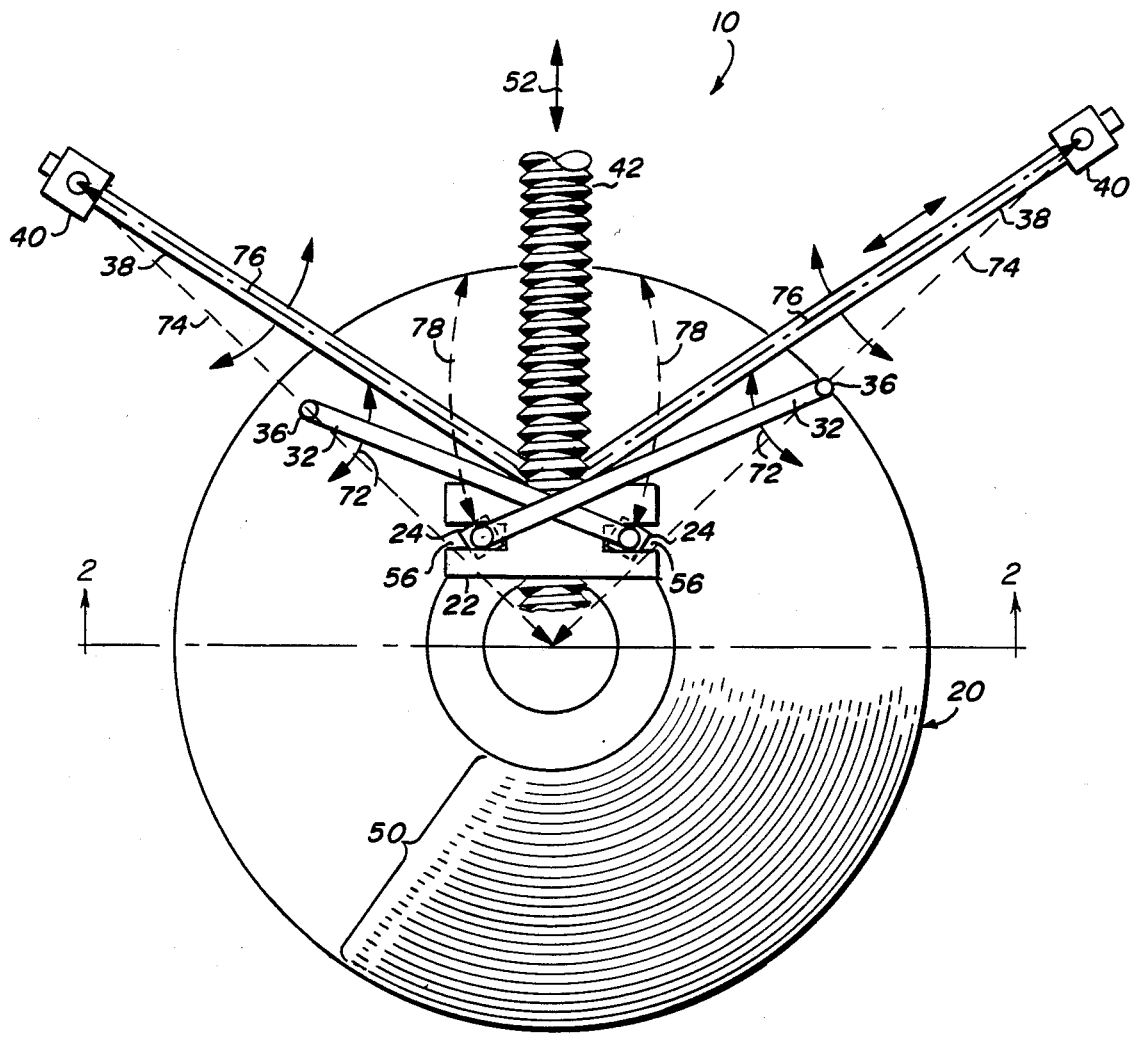
Fig_1
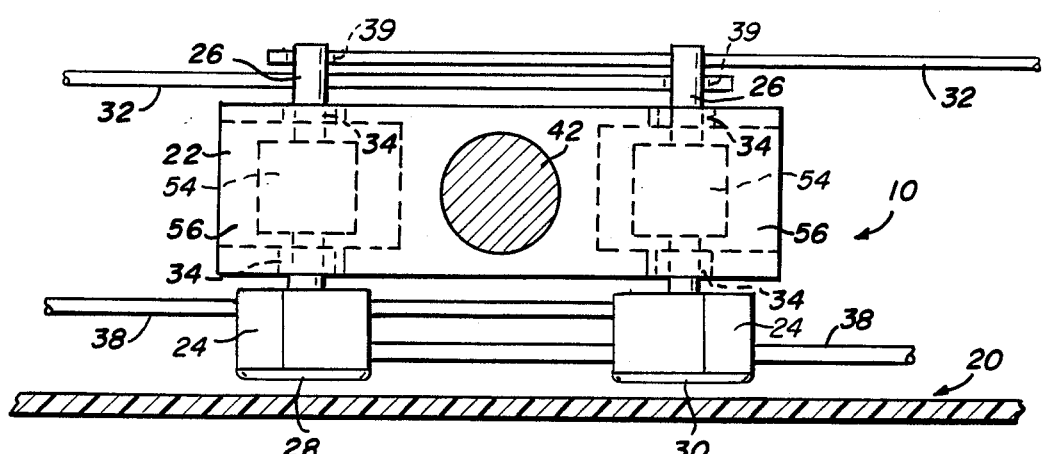
Fig_2

AUTOMATIC AZIMUTH ANGLE ADJUSTMENT HEAD MOUNTING STRUCTURE

BACKGROUND OF THE INVENTION

1. Field of the Invention

The present invention generally relates to a mounting structure for positioning a transducer head above a disk recording surface and more particularly to a mounting structure that automatically adjusts the azimuth angle of the transducer head of a disk drive relative to the recording disk.

2. Description of the Prior Art

Head mounting structures for disk drives that automatically adjust the azimuth angle of the read/write transducer head relative to the disk recording surface are not known in the prior art. Conventional disk drive technology utilizes head mounting structures that are driven in a radial path across the disk surface. The radial path is usually linear and does not require head azimuth angle adjustment in order for the head to record/retrieve data from conventional concentric or spiral data tracks on a disk recording surface.

The radial head path is also utilized in testing or certifying disk recording surfaces to ensure that the surface can accurately reproduce recorded data. Typically, floppy (flexible) recording disk manufacturers certify disks by loading such into a conventional disk drive and then operating the drive. Such a procedure is time consumming and requires enclosure of the disk in a disk jacket. The certification process is a quality control procedure used by most disk manufacturers to ensure that the disk will function properly when used by the end user. New disk technology requires a fast efficient means by which to certify the disks prior to encapsulating the disk in its protective cover due to the costs involved in manufacturing the disk envelopes. The disk manufacturer must be able to test the disk without the cover if cost efficiencies are to be realized.

Non-disk drive head mounting structures featuring head azimuth angular adjustment are known in the prior art. Such structures are disclosed in the following U.S. Pat. Nos.: Whittle, 4,314,296; Raabe, 4,111,433; Guy, 2,516,565; and Graham 1,438,642. Whittle discusses the use of manual adjustment screws to accomplish head azimuth angle changes in recording tape applications. Raabe, Guy, and Graham all relate to phonographic tone arm stylus mounting structures. Guy describes the use of a pulley system to accomplish stylus azimuth angle changes while Raabe and Graham discuss the use of equal length adjustment arms supported on or incorporated with the tone arm. In Guy and Graham the adjustment arms form a parallelogram configuration with at least one adjustment arm having a pivotably mounted end on the tone arm base and another end pivotably mounted on the stylus mounting structure. The azimuth angle change of the stylus is accomplished by radial movement of the tone arm wherein one of the adjustment arms extends as the other remains stationary or retracts causing the stylus mounting structure to rotate.

One disadvantage of the conventional prior art concerns the inability to automatically adjust head azimuth angles of disk drive transducer heads driven in a non-radial path across a disk recording surface.

Another disadvantage of the conventional prior art concerns the inability to automatically adjust the azimuth angle of multiple parallel transducer disk drive heads relative to a series of concentric data tracks located on a data surface when said heads are driven in a non-radial manner across a disk drive recording surface.

Another disadvantage of the prior art concerns the inability of the conventional disk drive to certify both concentric and spiral data track floppy recording disks without expensive modifications, thereby increasing the cost associated with disk certification.

A further disadvantage of the prior art concerns the inability to quickly and efficiently certify large numbers of non-enclosed disks.

SUMMARY OF THE PRESENT INVENTION

It is therefore an object of the present invention to provide an automatically adjustable azimuth angle disk drive transducer head mounting structure that can be driven in a non-radial path across the disk head recording surface and access all data recording tracks on said surface at the correct azimuth angle.

It is another object of the present invention to provide a disk drive head mounting structure that can automatically adjust the azimuth angle of multiple heads relative to a series of disk tracks when said heads are driven in a non-radial manner across the disk recording surface.

It is another object of the present invention to provide a disk drive head mounting structure capable of effecting a quick and inexpensive certification of disk recording disks by a multiple non-radially driven transducer head.

It is a further object of the present invention to provide a disk drive transducer head mounting structure that allows certification of both spiral and/or concentric data track recording disks without the need for the disk to be enclosed in a jacket thereby reducing the costs associated with disk certification.

Briefly, appratus in accordance with the invention provides for adjustably positioning a record/playback transducer during travel across a magnetic storage disk having a recording surface including a plurality of record tracks encircling the center of the disk, to maintain a predetermined azimuth between the transducer and each record track the transducer traverses as it moves along a non-linear path across the disk. For that purpose, the apparatus comprises a transducer carriage mounted for translational movement to cause bidirectional movement of the transducer across the recording surface of the disk. A mechanism, supporting the transducer, permits rotational and translational movement of the transducer relative to the carriage in a plane substantially parallel to the disk. A Position arm, coupled to the supporting mechanism, effects translational movement of the transducer relative to the carriage in response to movement of the carriage. The position arm cooperates with the carriage to cause the transducer to move along an arcuate path across the storage disk, from a record track remote from the center of the disk toward a record track adjacent the center of the disk or vice versa. A control arm, also coupled to the supporting mechanism, causes the transducer to rotate, in response to movement of the carriage, to vary the azimuth of the transducer as it moves across the recording surface of the disk. The control arm and the positioning arm cooperate to cause the transducer to maintain a predetermined azimuth angle with each record track the transducer traverses as it moves along its arcuate path across the storage disk.

In a preferred embodiment the head carriage supports two head support housings in a parallel arrangement. Each head support housing provides a mounting platform for either a recording transducer head or a retrieving transducer head. The heads are mounted on a surface of the head support housing furthest from said head carriage. A control arm and a position arm are attached to each head support housing. A pivotable position arm bushing is located at the midpoint of a ray extending from the central axis of the disk to a pivotable bushing for the corresonding control arm bushing. The head carriage is designed to move linearly in a radial fashion across a recording disk. Such movement is accomplished by use of a rotating worm gear interacting with the head carriage. In this configuration when a recording head is mounted on one head support housing and a retrieving head is mounted on the other support housing and the heads are driven cordially in a non-radial path across the surface of the recording disk, disk certification can be accomplished in minimal times. To certify the disk, the head carriage travels in a linear radial fashion from the outer most regions of the disk to the inner most regions of the disks or vice versa while the recording disk rotates. While being driven across the recording disk the recording head constantly records information on the data tracks while the retrieving head constantly retrieves information from the same data track. In this manner all usable data storage space on the disk may be tested in an efficient manner. Furthermore, the use of the two dedicated heads to certify the disk reduces the cost of the electronics necessary to utilize the heads further reducing the expense necessitated with certification.

An advantage of the present invention is that the heads can be driven in a non-radial path across a disk surface while accessing all data tracks on said surface at the optimum azimuth angle.

Another advantage of the present invention is that it provides a head mounting structure that automatically adjusts the azimuth angle of multiple heads relative to a series of data tracks on a disk recording media surface when the heads are driven in a non-radial manner across the recording disk surface.

Another advantage of the present invention is that it provides a structure whereby each data track can be certified by a record transducer head and a retrievable transducer head simultaneously.

Another advantage of the present invention is that it provides a quick and inexpensive method by which to certify disk recording surfaces without requiring that the disks be enclosed in any form of jacket.

A further advantage of the present invention is that it provides a structure that can certify either spiral or concentric data tracks on recording surfaces without any modifications thereby reducing costs associated with disk certification.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 illustrates a top perspective view of the head mounting structure according to the present invention; and FIG. 2 is a side view of the present invention of FIG. 1 taken along line 2—2.

DETAILED DESCRIPTION OF THE PREFERRED EMBODIMENT

Referring now to FIGS. 1 and 2, there is shown an automatic azimuth angle adjusting head mechanism of the present invention, referred to by a general reference character 10. The mechanism 10 is positioned above a magnetic recording disk referred to by a general reference character 20. Mechanism 10 includes a head carriage 22, two head support housings 24, two head support housing shafts 26, one recording transducer head 28, one retrieval transducer head 30, two position arms 32, four head support shaft bushings 34 located in carriage 22, two position arm rotary bushings 36, two control arms 38, two position arm support shaft rotary bushings 39, two control arm pivotable slide bushings 40, and a worm drive gear 42.

Positioned directly below mechanism 10 is disk 20. Disk 20 may be a conventional flexible (floppy) or rigid (hard) recording structures. As shown, disk 20 is of the flexible design. The only requirement for disk 20 is that the heads 28 and 30 can record data onto disk 20 and retrieve data from disk 20 when such data is stored on disk 20 in the forms of data tracks 50. Data tracks 50 may either be of a concentric circle design as shown in FIG. 1 or may be of a spiral pattern (not shown).

Head carriage 22 is supported on and motivated by worm drive gear 42. Worm drive 42 is radially positioned above disk 20 so that the head carriage 22 moves along a linear path over the disk 20 as indicated by direction arrows 52. Supported by head carriage 22 are the head support housings 24, support housing shaft 26, transducer heads 28 and 30, head support shaft bushings 34, and position arm support shaft bushings 39. Head support housings 24 are supportably mounted by head carriage 22 so that they are free to rotate and move in a direction perpendicular to the movement of head carriage 22 in a plane substantially parallel to the disk 20. To facilitate such mounting, head support housings 24 are physically attached to positioning blocks 54 located within head carriage 22. Positioning blocks 54 are free to rotate and move in a perpendicular direction to head carriage 22, via positioning channel 56 in head carriage 22.

Surrounding the upper portions of support shafts 26 are position arm support shaft bushings 39 which are mounted on position arms 32. The top portions of support shafts 26, as shown, are freely rotatable within the position arm support shaft bushings 39. The position arms 32 are of a non-telescoping nature such that the length of position arms 32 is constant throughout its movement, which movement is indicated by a pair of directional lines 72. Located at one end of each of the position arms 32 is one of the position arm pivotable bushings 36. Position arm pivotal bushings 36 are located at the midpoint along a ray 74 extending from the central axis of disk 20 to control arm pivotal bushing 40. Each of the control arm pivotal bushings 40 is positioned to be located at the intersection of the corresponding ray 74 with a family of imaginary lines 76 each of which is tangential to one of the tracks 50. By placing bushing 40 at the intersection of lines 76 by requiring that the end of control arms 38 is fixedly secured to head support housings 24, as shown in FIG. 2, housings 24 are caused to rotate as they follow an arcial path 78 over disk 20 ensuring that the azimuth angle between heads 28 and 30 with tracks 50 is always constant independent of the movement of heads 28 and 30 over disk 20.

Control arms 38 are of a telescoping design so that housings 24 may follow arcs 78 as defined by position arms 32. To accomplish this, bushings 40 may be of a hollow design and control arms 38 allowed to move through hollow bushings 40 to allow housings 24 to follow the arcs 78.

In operation, worm gear 42 rotates in either a clockwise or counterclockwise motion causing head support carriage 22 to travel in a linear motion above disk 20 and radially to the surface of the disk 20. As the head carriage 22 moves above disk 20, heads 28 and 30 are moved in the non-radial arc paths 78 across disk 20. The proper placement and rotation of heads 28 and 30 along the arcs 78 is insured by positioning arms 32 and control arms 38. Control arms 38 maintain a constant azimuth angle between tracks 50 and heads 28 and 30 while the path along arc 78 of heads 28 and 30 is achieved by positioning arms 32 guiding head support shafts 26. When head carriage 22 is moved, control arms 38 either extend or contract accordingly.

By allowing the heads 28 and 30 to travel nonlinearly across the disk 20 along path 78 as shown in FIG. 1, the azimuth angle of heads 28 and 30 is automatically adjusted so that heads 28 and 30 may simultaneously access all of the tracks 50 located on disk 20. As shown, assembly 10 can effectively and quickly certify disk 20 in a spiral or circular fashion. In this manner, all of the available tracks 50 are certified by write head 28 and read head 30 functioning simultaneously. Furthermore, disk 20 may be certified without being encapsulated in any type of protective envelope so as to eliminate the expense and time of placing defective disks in disk jackets.

Additionally, the use of two or more transducer heads operating on a spiral path and capable of reading and simultaneously writing on the same track 50 reduces the cost of the electronics necessary to certify the disk as one head can constantly write data on a track while another head constantly reads data from the same track. All heads can be driven by the same generator. The conventional, expensive, read/write switching and track stepping head electronics are not necessary to the operation of the system.

While, for the sake of clearness and in order to disclose the invention so that the same can be readily understood, a specific embodiment has been described and illustrated. It is understood that the present invention is not limited by the specific means disclosed. It may be embodied in other ways that will suggest themselves to persons skilled in the art. It is believed that this invention is new and that all such changes that fall within the scope of the following claims are to be considered as part of the invention.

I claim:

1. Apparatus for use with a rotatable magnetic storage disk having a recording surface including a plurality of record tracks encircling the center of the disk, said apparatus comprising:
   (a) a magnetic record head and a magnetic playback head for respectively recording and retrieving data from such a storage disk;
   (b) a carriage movably mounted for carrying said record head and said playback head across the recording surface of the storage disk so that said record head and said playback head simultaneously interface with any given record track of such disk for respectively recording data and concomitantly retrieving data from that record track;
   (c) drive means, coupled to said carriage, for moving said carriage across the recording surface of such storage disk;
   (d) a first supporting mechanism mounting said record head for rotational and translational movement relative to said carriage in a plane substantially parallel to the recording surface of the disk;
   (e) a second supporting mechanism mounting said playback head for rotational and translational movement relative to said carriage in a plane substantially parallel to the recording surface of the disk;
   (f) positioning means, including first and second positioning arms coupled respectively to said first supporting mechanism and said second supporting mechanism, and arranged to effect respectively, orthogonal movement of said record head and said playback head relative to the direction of movement of said carriage, said first and second positioning arms cooperating with said carriage to cause said record head and said playback head to move simultaneously, in response to movement of said carriage, along respective non-linear operational paths across the storage disk, between a record track remote from the center of the disk and a record track adjacent the center of the disk; and
   (g) control means, including first and second control arms coupled respectively to said first supporting mechanism and said second supporting mechanism, to cause said record head and said playback head to rotate, relative to and in response to movement of said carriage, said first and second control arms respectively causing the orientation of said record head and said playback head to vary as they move across the recording surface of the disk, wherein said first and second control arms cause the record head and the playback head to maintain a predetermined azimuth with respect to each record track the record head and the playback head traverse as they move along their respective non-linear paths across the storage disk.

2. Apparatus as defined in claim 1 wherein each of said control arms is arranged to rotate about a respective pivot, to cause the corresponding magnetic head to rotate.

3. Apparatus as defined in claim 2 wherein each of said positioning arms is arranged to rotate about a respective pivot, to effect orthogonal movement of the corresponding magnetic head relative to said carriage.

4. Apparatus as defined in claim 3 wherein the pivot for said positioning arm associated with said record head is midway between the center of the disk and the pivot for the control arm associated with said record head.

5. Apparatus as claimed in claim 2 wherein each of said control arms is supported at its pivot by a hollow bushing through which said control arm is adapted to pass.

6. Apparatus as claimed in claim 4 wherein each of said positioning arms is supported at its pivot by a rotatable bushing.

7. Apparatus as claimed in claim 2 wherein the pivot associated respectively with each of said control arms is located at an intersection common to an axis radially extending from the center of such disk and a family of axes each of which is tangent to an individual record track.

8. Apparatus as claimed in claim 1 wherein the nonlinear path corresponding to each of the magnetic heads is arcuate, defining a segment of a circle extendable through the center of the storage disk.

* * * * *